United States Patent
Farrand et al.

(10) Patent No.: US 9,494,808 B2
(45) Date of Patent: *Nov. 15, 2016

(54) PARTICLES FOR ELECTROPHORETIC DISPLAYS

(71) Applicant: Merck Patent GmbH, Darmstadt (DE)

(72) Inventors: Louise Diane Farrand, Dorset (GB); Emily Jane Thomas, New Milton (GB); Claire Topping, Southampton (GB); Jonathan Henry Wilson, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/400,620

(22) PCT Filed: May 7, 2013

(86) PCT No.: PCT/EP2013/001337
§ 371 (c)(1),
(2) Date: Nov. 12, 2014

(87) PCT Pub. No.: WO2013/170934
PCT Pub. Date: Nov. 21, 2013

(65) Prior Publication Data
US 2015/0129817 A1  May 14, 2015

(30) Foreign Application Priority Data
May 14, 2012 (EP) .................................... 12003783

(51) Int. Cl.
| | | |
|---|---|---|
| C09K 9/00 | (2006.01) |
| G02F 1/00 | (2006.01) |
| C08F 2/44 | (2006.01) |
| C08F 220/14 | (2006.01) |
| C08F 292/00 | (2006.01) |
| G02F 1/167 | (2006.01) |
| C09B 69/10 | (2006.01) |
| B01J 13/02 | (2006.01) |
| B05D 7/00 | (2006.01) |

(52) U.S. Cl.
CPC ............. *G02F 1/0018* (2013.01); *C08F 2/44* (2013.01); *C08F 220/14* (2013.01); *C08F 292/00* (2013.01); *C09B 69/106* (2013.01); *G02F 1/167* (2013.01); *G02F 2001/1678* (2013.01)

(58) Field of Classification Search
USPC ............. 252/500, 501.1, 583; 359/290, 296; 428/402; 524/555, 850, 853; 526/311, 526/312, 257; 534/560, 561, 829; 204/450; 427/213.3
See application file for complete search history.

(56) References Cited

U.S. PATENT DOCUMENTS

| | | |
|---|---|---|
| 5,380,362 A | 1/1995 | Schubert |
| 5,403,518 A | 4/1995 | Schubert |
| 5,599,889 A | 2/1997 | Stover et al. |
| 5,783,614 A | 7/1998 | Chen et al. |
| 5,932,633 A | 8/1999 | Chen et al. |
| 5,964,935 A | 10/1999 | Chen et al. |
| 6,117,368 A | 9/2000 | Hou |
| 6,194,488 B1 | 2/2001 | Chen et al. |
| 6,842,275 B2 | 1/2005 | Kawai |
| 6,956,690 B2 | 10/2005 | Yu et al. |
| 7,038,655 B2 | 5/2006 | Herb et al. |
| 7,052,766 B2 | 5/2006 | Zang et al. |
| 7,110,162 B2 | 9/2006 | Wu et al. |
| 7,170,670 B2 | 1/2007 | Webber |
| 7,226,550 B2 | 6/2007 | Hou et al. |
| 7,236,290 B1 | 6/2007 | Zhang et al. |
| 7,247,379 B2 | 7/2007 | Pullen et al. |
| 7,277,218 B2 | 10/2007 | Hwang et al. |
| 7,304,634 B2 | 12/2007 | Albert et al. |
| 7,880,955 B2 | 2/2011 | Naijo et al. |
| 2007/0128352 A1 | 6/2007 | Honeyman et al. |
| 2007/0268244 A1 | 11/2007 | Chopra et al. |
| 2009/0201569 A1 | 8/2009 | Akashi et al. |
| 2009/0207476 A1 * | 8/2009 | Yanagisawa et al. ........ 359/296 |
| 2010/0002287 A1 | 1/2010 | Naijo et al. |
| 2011/0175939 A1 | 7/2011 | Moriyama et al. |
| 2011/0297888 A1 * | 12/2011 | Farrand et al. ............ 252/501.1 |
| 2012/0112131 A1 | 5/2012 | Li et al. |
| 2015/0099119 A1 | 4/2015 | Farrand et al. |
| 2015/0126680 A1 | 5/2015 | Farrand et al. |
| 2015/0129819 A1 | 5/2015 | Farrand et al. |
| 2015/0168746 A1 | 6/2015 | Blackman et al. |

FOREIGN PATENT DOCUMENTS

| | | | |
|---|---|---|---|
| GB | 2438436 A | 11/2007 | |
| GB | WO 2012019704 A1 * | 2/2012 | ........... C09B 62/465 |
| JP | 2008122468 A | 5/2008 | |
| JP | 2008274248 A | 11/2008 | |
| JP | 2008274249 A | 11/2008 | |
| JP | 2009031329 A | 2/2009 | |

(Continued)

OTHER PUBLICATIONS

International Search Report for PCT/EP2013/001337 mailed Sep. 26, 2013.

(Continued)

*Primary Examiner* — Bijan Ahvazi
(74) *Attorney, Agent, or Firm* — Drinker Biddle & Reath LLP

(57) ABSTRACT

This invention relates to particles comprising a pigment core particle encapsulated by a polymer, a process for their preparation, electrophoretic fluids comprising such particles, and electrophoretic display devices comprising such fluids.

17 Claims, No Drawings

(56) References Cited

FOREIGN PATENT DOCUMENTS

| JP | 2009256635 A | 11/2009 |
|---|---|---|
| WO | WO-99/10767 A1 | 3/1999 |
| WO | WO-02093246 A1 | 11/2002 |
| WO | WO-2004067593 A2 | 8/2004 |
| WO | WO-2005017046 A2 | 2/2005 |
| WO | WO-2005036129 A2 | 4/2005 |
| WO | WO-2009086079 A2 | 7/2009 |
| WO | WO-2010089057 A2 | 8/2010 |
| WO | WO-2010089059 A1 | 8/2010 |
| WO | WO-2010104606 A1 | 9/2010 |
| WO | WO-2010148061 A2 | 12/2010 |
| WO | WO-2011017446 A1 | 2/2011 |
| WO | WO-2011075720 A1 | 6/2011 |
| WO | WO-2012019704 A1 | 2/2012 |
| WO | WO-2012152392 A1 | 11/2012 |

OTHER PUBLICATIONS

Kim, M., et al., "Synthesis of mondisperse PS-co-PDMS microspheres by dispersion polymerization", Materials Science and Engineering: C, vol. 27, (2007), pp. 1247-1251.

Klein, S., et al., "Preparation of monodisperse PMMA microspheres in nonpolar solvents by dispersion polymerization with a macromonomeric stabilizer", Colloid Polymer Science, vol. 202, (2003), pp. 7-13.

International Search Report for PCT/EP2013/001338 mailed Oct. 4, 2013.

International Search Report for PCT/EP2013/001335 mailed Sep. 25, 2013.

International Search Report for PCT/EP2013/001339 mailed Sep. 25, 2013.

International Search Report for PCT/EP2013/001336 mailed Sep. 2, 2013.

O'Neill, M., et al., "Dispersion Polymerization in Supercritical CO2 with Siloxane-Based Macromonomer. 2. The Particle Formation Regime", Macromolecules, 1998, vol. 31, pp. 2848-2856.

Shaffer, K., et al., "Dispersion Polymerization in Carbon Dioxide Using Siloxane-Based Stabilizers", 1996, vol. 29, pp. 2704-2706.

Smulders, W., et al., Seeded Emulsion Polymerisation of Block Copolymer Core-Shell Nanoparticles with Controlled Particle Size and Molecular Weight Distribution Using Xanthate-Based RAFT Polymerization, Macromolecules, 2004, vol. 37, pp. 4474-4483.

\* cited by examiner

PARTICLES FOR ELECTROPHORETIC DISPLAYS

CROSS-REFERENCE TO RELATED APPLICATIONS

This application is a national stage application (under 35 U.S.C. §371) of PCT/EP2013/001337, filed May 7, 2013, which claims benefit of European Application No. 12003783.3, filed May 14, 2012, both of which are incorporated herein by reference in their entirety.

This invention relates to particles comprising a pigment core particle encapsulated by a polymer, a process for their preparation, electrophoretic fluids comprising such particles, electrophoretic display devices comprising such fluids, and the use of the particles in optical, electrooptical, electronic, electrochemical, electrophotographic, electrowetting and electrophoretic displays and/or devices, in security, cosmetic, decorative or diagnostic applications.

EPDs (Electrophoretic Displays) and their use for electronic paper have been known for a number of years. An EPD generally comprises charged electrophoretic particles dispersed between two substrates, each comprising one or more electrodes. The space between the electrodes is filled with a dispersion medium which is a different colour from the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels. Mainly black and white particles are used.

Particles suitable for use in electrophoretic displays (EPD), e.g. coloured electronic paper have been exemplified in recent patent literature; e.g. (U.S. Pat. No. 7,304,634, GB 2 438 436, US 2007/0268244, WO 2010/089057, WO 2012/019704). Particles coated with a surface layer to promote good dispersibility in dielectric media are disclosed in WO 2004/067593, US 2011/0079756, U.S. Pat. No. 5,964,935, U.S. Pat. No. 5,932,633, U.S. Pat. No. 6,117,368, WO 2010/148061, WO 2002/093246, WO 2005/036129, US 2009/0201569, U.S. Pat. No. 7,236,290, JP 2009031329, U.S. Pat. No. 7,880,955, and JP 2008122468. The use of polydimethylsiloxane stabilisers in the specific synthesis of polymer particles is described in the state of the art (Kim et al, Materials Science and Engineering, C 27 (2007), 1247-1251; Klein et al, Colloid Polym Sci (2003) 282: 7-13; JP 2009256635, JP 2008274248, JP 2008274249).

However, there continues to be a need for improved electrophoretic fluids and coloured polymer particles which can be easily prepared and dispersed in non-polar media.

The present invention relates to particles comprising pigment core particles encapsulated by a polymer comprising monomer units of at least one polymerisable dye, at least one polymerisable steric stabiliser, at least one co-monomer, optionally at least one charged co-monomer, and optionally at least one crosslinking co-monomer, a process for their preparation, the use of the particles in electrophoretic fluids, and electrophoretic display devices comprising these fluids. The subject matter of this invention specifically relates to reflective coloured particles, and to electrophoretic fluids and displays comprising such reflective coloured particles.

Preferably, the present invention relates to particles comprising a single pigment core particle encapsulated by a polymer as described above and wherein the particles comprise at least one surfactant.

In particular, the present invention relates to particles comprising a single pigment core particle coated with at least one surfactant and encapsulated by a polymer as described above. Such particles have the further advantage that the pigment core particle, i.e. titanic (titanium dioxide) is located near the centre of particles and is well dispersed.

The present coloured particles are hybrid polymer/pigment particles. These particles can comprise a highly reflective pigment core, especially titania core, combined with a dye. This has the effect of increasing the reflectivity or 'Y' value of the coloured particle. The Y value is derived from the CIE colour space system, where Y is defined to be the brightness or luminance. The particles do not show a detrimental effect on hue, i.e. if a particle is prepared by combining $TiO_2$ with a magenta dye and forms a particle, the shade of magenta does not shift to yellow or blue, it simply appears a brighter magenta as it shifts towards the white point.

Furthermore, if reduction of settling is a more important factor, the particles may comprise white $SiO_2$ particles which have a low density. A combination of core particles may also be used.

The invention provides a method to produce particles suitable for use in EPD which have controllable size, reflectivity, density, monodispersity, and steric stability and require no drying process to disperse in a solvent suitable for EPD. Advantageously, the invention provides coloured particles with increased reflectivity. So, EPD displays comprising reflective coloured particles of the invention appear bright and appealing to a viewer.

The present invention provides particles, especially reflective coloured particles which can be easily dispersed in nonpolar media and show electrophoretic mobility. Particle size, polydispersity, and density can be controlled and the present incorporation of pigment into polymeric particles does neither require multiple process steps nor expensive drying steps, i.e. freeze drying. The present process involves one simple polymerisation step. The present process facilitates the formulation of electrophoretic fluids since it is done in a non-polar organic solvent instead of aqueous media. The particles can be prepared in the solvent of choice for EPD formulations, therefore no unwanted solvent contamination occurs and no disposal or recycling of solvent is necessary. Particles of the invention are easily dispersed in dielectric, organic media, which enables switching of the particles in an applied electric field, preferably as the electrically switchable component of a full colour e-paper or electrophoretic display.

The present coloured polymer particles can be produced by encapsulating at least one highly reflective inorganic or organic pigment particle in an organic coloured polymer by a dispersion polymerisation. This yields a coloured hybrid particle which exhibits excellent reflectivity where the inorganic material is encapsulated by a tough polymer that forms a polymeric shell. This tough shell prevents particle agglomeration.

Advantageously, surfactants can be used to separate pigment particles while still allowing them to be encapsulated by the polymer. In particles not comprising a surfactant pigment particles may be aggregated and this may result in lower reflectivity. By control of level of surfactant, the pigment particles are dispersed well in the polymer particles.

Particles of the invention comprise sterical stabilisers covalently bonded into the pigment core particles. Advantageously, the present invention does not require custom synthesised stabilisers with difficult to control steric lengths and multistep complex syntheses with expensive or difficult to synthesise components.

The invention enables the synthesis of new coloured, preferably cross-linked polymer particles for EPD and allows formation of monodisperse polymer particles in a non-polar solvent suitable for use in an EPD. No solvent transfer or drying is required. A steric stabiliser is readily incorporated into the coloured polymer particles which do not need specific chemical groups and/or reactions. The stabiliser solely needs the presence of another monomer and is polymerised into the particle and cannot be removed by solvent washing or over time. The particles may comprise at least 5% by weight of a steric stabiliser, preferably at least 20% by weight, based on the weight of the polymer particles. Dyes are also irreversibly entangled into the forming polymer particles as well as the stabiliser, so that the dye is not able to leach from the particle over a long time period. Advantageously, the coloured polymeric particles of the invention have a much lower density than inorganic pigment particles whose use has been reported in EPD. In an EPD, these particles should settle much more slowly than inorganic pigment particles, allowing for better bistability. Additionally, the particles do not swell in non-polar EPD solvents especially when cross-linked through dyes with more than one polymerisable group and/or additional cross-linking co-monomers. Furthermore, the coloured polymer particles of the invention, preferably cyan, magenta and yellow particles have good mobility when switched in an electrophoretic cell.

An essential component of the present invention is a polymerisable dye comprising at least one polymerisable group, preferably at least two polymerisable groups. By use of a dye with 2 or more polymerisable groups, the dye does not leach into the solvent. In general the polymerisable dyes may be solvent soluble or water soluble and they may be anionic, cationic, zwitterionic or neutral. Preferably, an ionic, water soluble dye could be used which is also insoluble in dodecane.

Cationic polymerisable dyes contain a covalently attached group or groups which have a positive charge in the application or contain a positive charge in the chromophore group. They can be derived from protonation or quaternation of nitrogen, phosphorous, oxygen or sulphur atoms or groups containing them, for example heteroaromatic (thiazole, imidazole) delocalised nitrogen bases (guanidine etc). Associated anions preferably have a single charge and can preferably be halogen, preferably $F^-$, $Cl^-$, $Br^-$, monobasic acid (oxo) anions, preferably acetate, propionate, lactate, methane sulphonate, p-toluenesulphonate, hydroxide, and nitrate.

Preferred examples of water soluble cationic polymerisable dyes comprise as counter ion $MeOSO_3^-$. Also preferably suitable are $Cl^-$, $Br^-$, and acetate.

Anionic polymerisable dyes contain a covalently attached group or groups which have a negative charge in the application and can be derived from deprotonation of an acidic group for example sulphonic, carboxylic, phosphonic acids. Associated cations preferably have a single charge and can be metallic ($Li^+$, $Na^+$, $K^+$ etc), charged nitrogen ($NH_4^+$, $NEt_3H^+$, $NEt_4^+$, $NMe_4^+$, imidazolium cation etc), positively charged phosphorous, sulphur etc. Preferred examples of water soluble anionic dyes are the $Na^+$, $NH_4^+$, $NEt_4^+$ salts of the acids.

The function of the polymerisable dye is to colour the particle. The polymerisable dye consists of a chromophore, at least two polymerisable groups, optional linker groups (spacers), and optional groups to modify physical properties (like solubility, light fastness, etc.) and optionally charged group(s).

The polymerisable dye preferably comprises a chromophoric group and two polymerisable groups selected from e.g. methacrylates, acrylates, methacrylamides, acrylamides, acrylonitriles, α-substituted acrylates, styrenes and vinyl ethers, vinyl esters, propenyl ethers, oxetanes and epoxys etc., in particular methacrylates and acrylates.

A polymerisable dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

Modified polymerisable dyes (with reactive group(s)) from the application groups of reactive (anionic), direct (anionic), acidic (anionic) and basic (cationic) dyes as designated by the Colour Index (published by The Society of Dyers and Colourists with the American Association of Textile Chemists and Colorists e.g. $3^{rd}$ edition 1982) are preferred.

The polymerisable groups may be attached directly to the chromophoric group or may be attached through a linker group L.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phtalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups.

Preferred polymerisable dyes are azo dyes, metallised dyes, anthraquinone dyes, phthalocyanine dyes, benzodifuranones dyes, Brilliant Blue derivatives, pyrroline dyes, squarilium dyes, triphendioxazine dyes or mixtures of these dyes, especially azo dyes, metallised dyes, anthraquinone dyes, phthalocyanine dyes, benzodifuranones dyes, pyrroline dyes, squarilium dyes or mixtures of these dyes.

Preferably dyes with more than one polymerisable group are used. In principle any polymerisable dye can be used, preferable with more than one polymerisable group (most preferably with 2 polymerisable groups) and preferably with a methacrylate or acrylate function. Advantageously, the polymerisable dyes disclosed in WO2010/089057 and WO2012/019704 are used. Preferably dyes of Formulas (I')-(VI') are used:

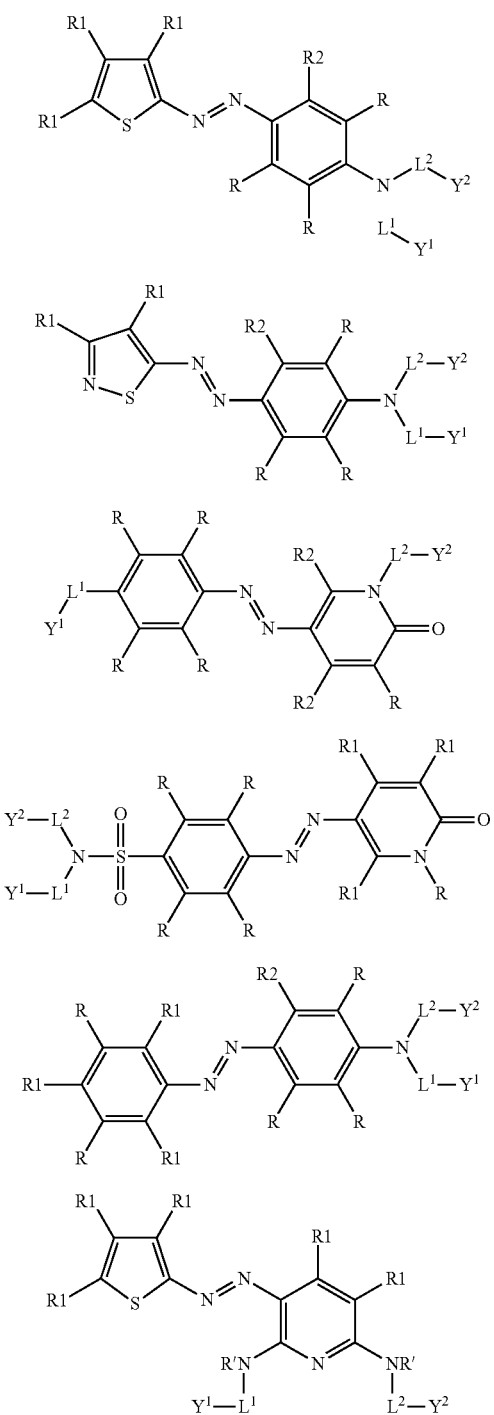

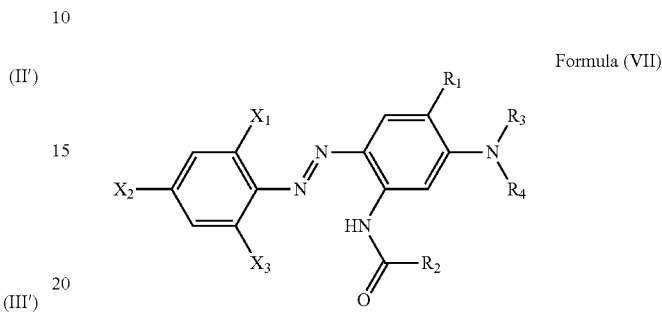

Formula (VII)

Especially preferred are polymerisable dyes of Formulas (I')-(VI') wherein R is H; R1 and R2 are independently of one another —CH₃, —NO₂, —OH, —CN, —COCH₃, —CO₂CH₂CH₃, —NHCOR'; L¹ and L² are, preferably identical, C2-C4 alkyl, and Y¹ and Y² are, preferably identical, methyl acrylate or methyl methacrylate, wherein R2 is preferably —CH₃, —OH or —NHCOR'.

Also polymerisable dyes of Formula (VII) are preferably used.

Wherein $X_1$, $X_2$, and $X_3$ are independently of one another H or an electron-withdrawing group;

$R_1$ is H or OR' with R'=a linear, branched or cyclic alkyl group;

$R_2$ is a linear, branched or cyclic alkyl group;

$R_3$ and $R_4$ are independently of one another groups of the structure $L_3$-$Y_3$, $L_4$-$Y_4$.

$L_3$, and $L_4$ are linker groups and independently of one another linear or branched, substituted or unsubstituted alkylene groups where one or more non-adjacent carbon atoms may be replaced by O, S and/or N, preferably O;

$Y_3$, and $Y_4$ are independently of one another polymerisable groups;

Wherein at least one of $R_3$ and $R_4$ comprises a polymerisable group and at least one of $X_1$, $X_2$, and $X_3$ is an electron-withdrawing group.

The term "electron-withdrawing group" is well known in the art and refers to the tendency of a substituent to attract valence electrons from neighbouring atoms; in other words the substituent is electronegative with respect to neighbouring atoms. Examples of electron-withdrawing groups include NO₂, CN, halogen, acyl, trifluoromethoxy, trifluoromethyl, SO₂F, and CO₂R, SO₂R, SO₂NRR or SO₂NHR, with R being independently linear or branched alkyl, preferably C1-C4 alkyl. Preferably, at least one of $X_1$, $X_2$, and $X_3$ is NO₂, CN, Br, Cl, SO₂NRR or SO₂NHR. Especially preferred are polymerisable dyes with $X_2$ and one of $X_1$ and $X_3$ being NO₂, CN, Br, Cl, SO₂NRR or SO₂NHR, preferably with R=methyl. Also preferred are polymerisable dyes with $X_2$ being NO₂, CN, Br, Cl, SO₂NRR or SO₂NHR, preferably with R=methyl, and $X_1$ and $X_3$ being H.

The polymerisable groups $Y_3$, and $Y_4$ may be selected from e.g. methacrylate, acrylate, methacrylamide, acrylamide, oxetanes, vinyl, vinyloxy, epoxy, allyl, propenyl ether, styryl groups, in particular methacrylate, acrylate, methacrylamide, and acrylamide. Preferably, groups $Y_3$, and $Y_4$ are selected from methacrylate and acrylate.

$R_1$ and $R_2$ are preferably C1-C20 alkyl groups, especially alkyl groups having 1 to 10 carbon atoms. C2-C8 alkyl groups are even more preferred.

$R_3$ and $R_4$ are independently of one another groups of the structure $L_3$-$Y_3$ or $L_4$-$Y_4$, preferably $L_3$ and $L_4$ are independently of one another linear or branched C1-C20 alkylene groups, especially alkylene groups having 1 to 10 carbon wherein R is H; R1 and R2 are independently of one another alkyl, preferably C1-C6 alkyl, —OR', —SR', —C(O)R', —C(O)OR', —NHCOR', —NO₂, —CN, with R' equal to H or alkyl, preferably C1-C6 alkyl, especially C1-C3 alkyl; L¹ and L² are independently of one another a single bond, C1-C6 alkyl, a polyether alkyl chain, or a combination thereof, preferably C2-C4 alkyl, especially C2 and C4 alkyl, especially identical groups L¹ and L² are preferred; and Y¹ and Y² are methyl acrylate or methyl methacrylate, especially identical groups Y¹ and Y² are preferred.

atoms. Linear C2-C6 alkylene groups are even more preferred. Especially groups where $Y_3$ and $Y_4$ are methacrylate or acrylate are preferred. Especially identical groups $Y_3$ and $Y_4$ are preferred.

Preferred polymerisable dyes are in particular those dyes in which all variables have the preferred meanings.

The following are examples of dyes which can preferably be used:

TABLE 1

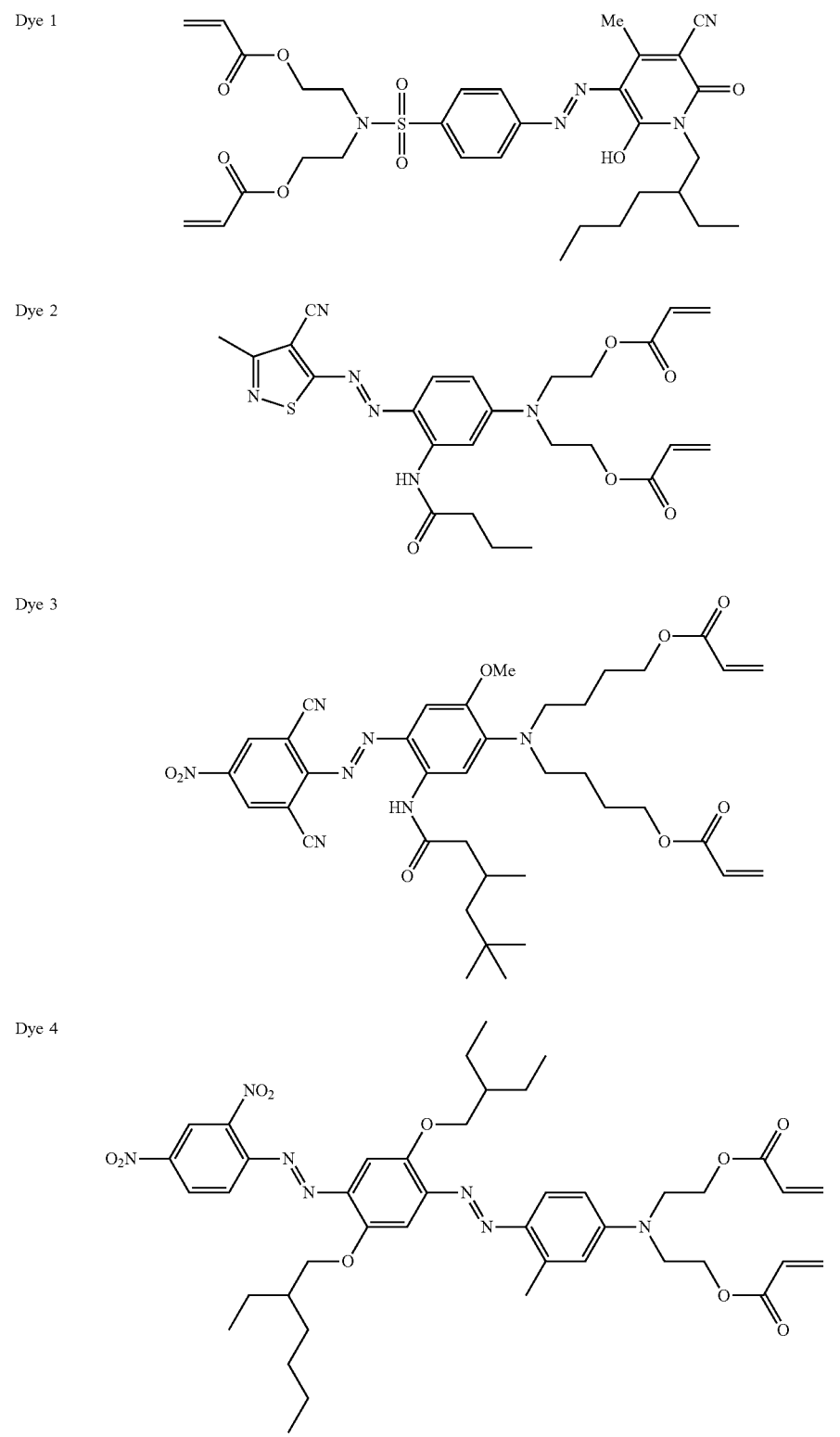

TABLE 1-continued
Dye 5
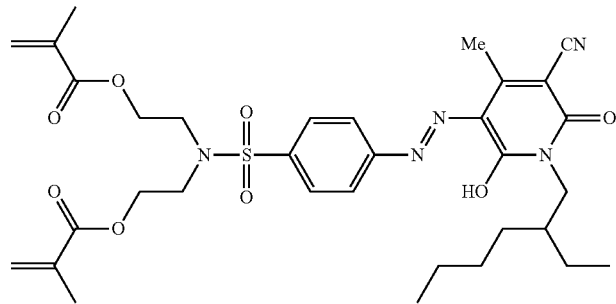 [SMILES: C=C(C)C(=O)OCCN(CCOC(=O)C(=C)C)S(=O)(=O)c1ccc(/N=N/c2c(C)c(C#N)c(=O)n(CC(CC)CCCC)c2O)cc1]
Dye 6
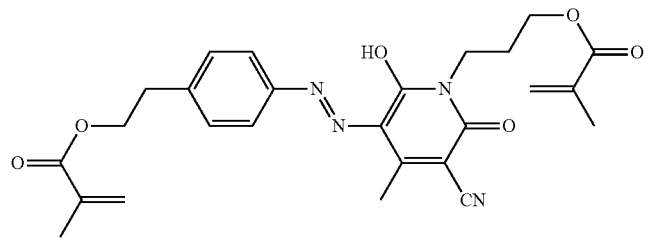 [SMILES: C=C(C)C(=O)OCCCn1c(O)c(/N=N/c2ccc(CCOC(=O)C(=C)C)cc2)c(C)c(C#N)c1=O]
Dye 7
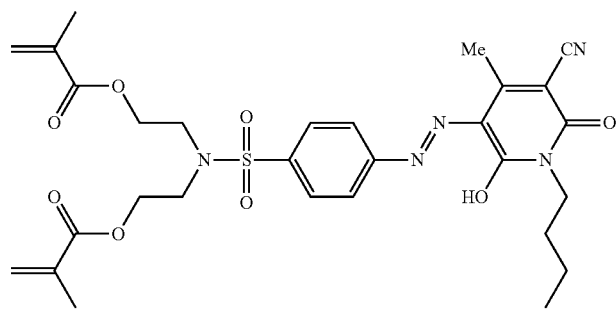 [SMILES: C=C(C)C(=O)OCCN(CCOC(=O)C(=C)C)S(=O)(=O)c1ccc(/N=N/c2c(C)c(C#N)c(=O)n(CCCC)c2O)cc1]
Dye 8
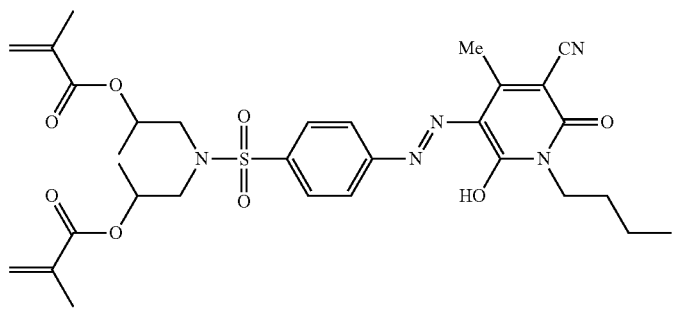 [SMILES: C=C(C)C(=O)OC(C)CN(CC(C)OC(=O)C(=C)C)S(=O)(=O)c1ccc(/N=N/c2c(C)c(C#N)c(=O)n(CCCC)c2O)cc1]
Dye 9
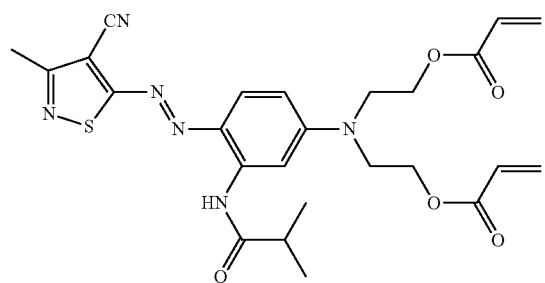 [SMILES: C=CC(=O)OCCN(CCOC(=O)C=C)c1ccc(/N=N/c2snc(C)c2C#N)c(NC(=O)C(C)C)c1]

TABLE 1-continued
Dye 10
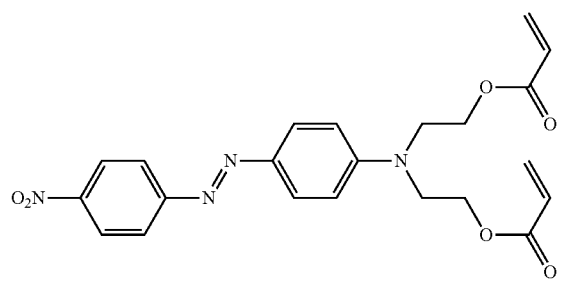 [SMILES: C=CC(=O)OCCN(CCOC(=O)C=C)c1ccc(/N=N/c2ccc([N+](=O)[O-])cc2)cc1]
Dye 11
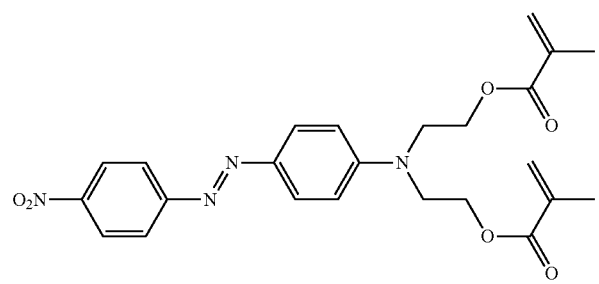 [SMILES: C=C(C)C(=O)OCCN(CCOC(=O)C(=C)C)c1ccc(/N=N/c2ccc([N+](=O)[O-])cc2)cc1]
Dye 12
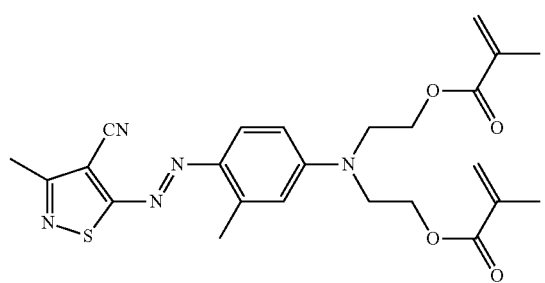 [SMILES: C=C(C)C(=O)OCCN(CCOC(=O)C(=C)C)c1ccc(/N=N/c2snc(C)c2C#N)c(C)c1]
Dye 13
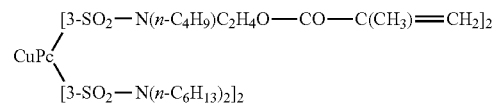
Dye 14
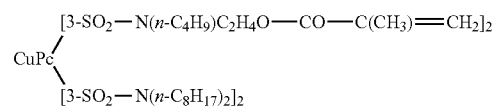
Dye 15
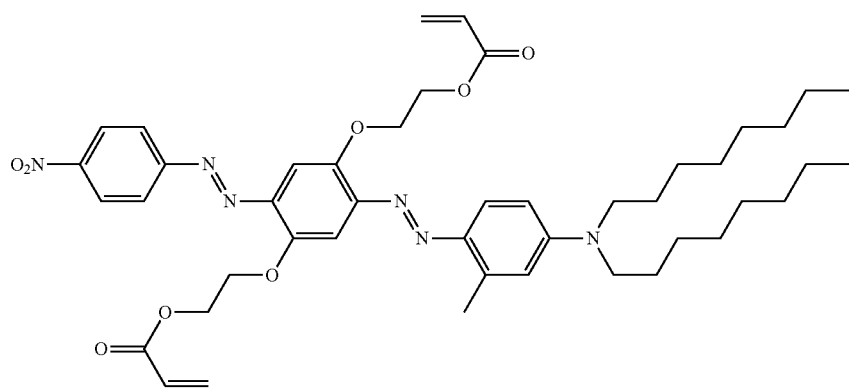 [SMILES: C=CC(=O)OCCOc1cc(/N=N/c2ccc(N(CCCCCCCC)CCCCCCCC)cc2C)c(OCCOC(=O)C=C)cc1/N=N/c1ccc([N+](=O)[O-])cc1]

TABLE 1-continued

Dye 16

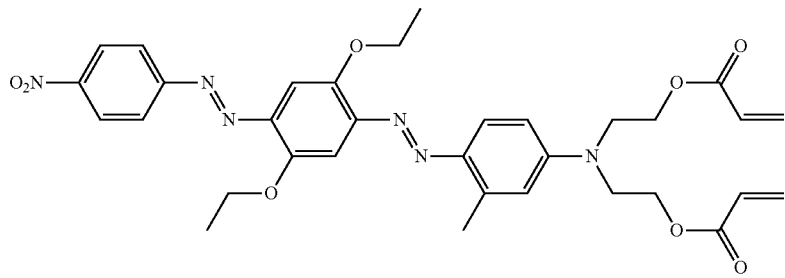 [SMILES: C=CC(=O)OCCN(CCOC(=O)C=C)c1ccc(/N=N/c2cc(OCC)c(/N=N/c3ccc([N+](=O)[O-])cc3)cc2OCC)c(C)c1]

Dye 17

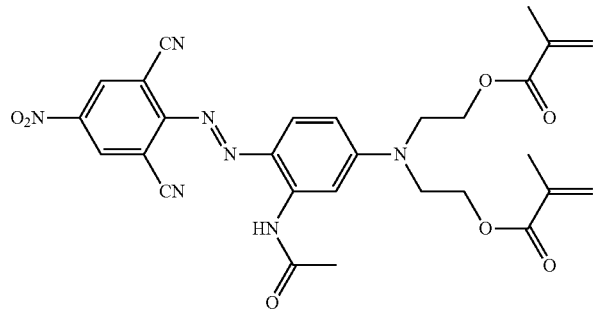 [SMILES: C=C(C)C(=O)OCCN(CCOC(=O)C(=C)C)c1ccc(/N=N/c2c(C#N)cc([N+](=O)[O-])cc2C#N)c(NC(C)=O)c1]

Dye 18

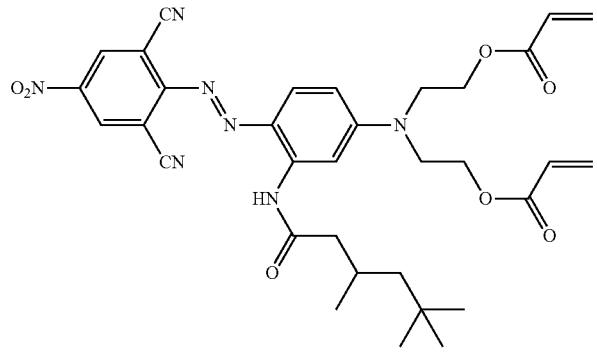 [SMILES: C=CC(=O)OCCN(CCOC(=O)C=C)c1ccc(/N=N/c2c(C#N)cc([N+](=O)[O-])cc2C#N)c(NC(=O)CC(C)CC(C)(C)C)c1]

Most preferred are the following dyes: Dye 1, Dye 2, Dye 3, and Dye 4.

Polymerisable dyes, especially the preferred polymerisable dyes can be prepared according to the processes described in WO2010/089057 and WO2012/019704, especially according to WO2012/019704.

The preparation of polymerisable dyes of Formula (VII) by a 7 step procedure under convenient conditions as known in the art is exemplified in the following scheme for (E)-4,4'-(4-((2,6-dicyano-4-nitrophenyl)diazenyl)-2-methoxy-5-(3,5,5-trimethylhexanamido)phenylazanediyl)bis(butane-4,1-diyl)diacrylate (Dye 3):

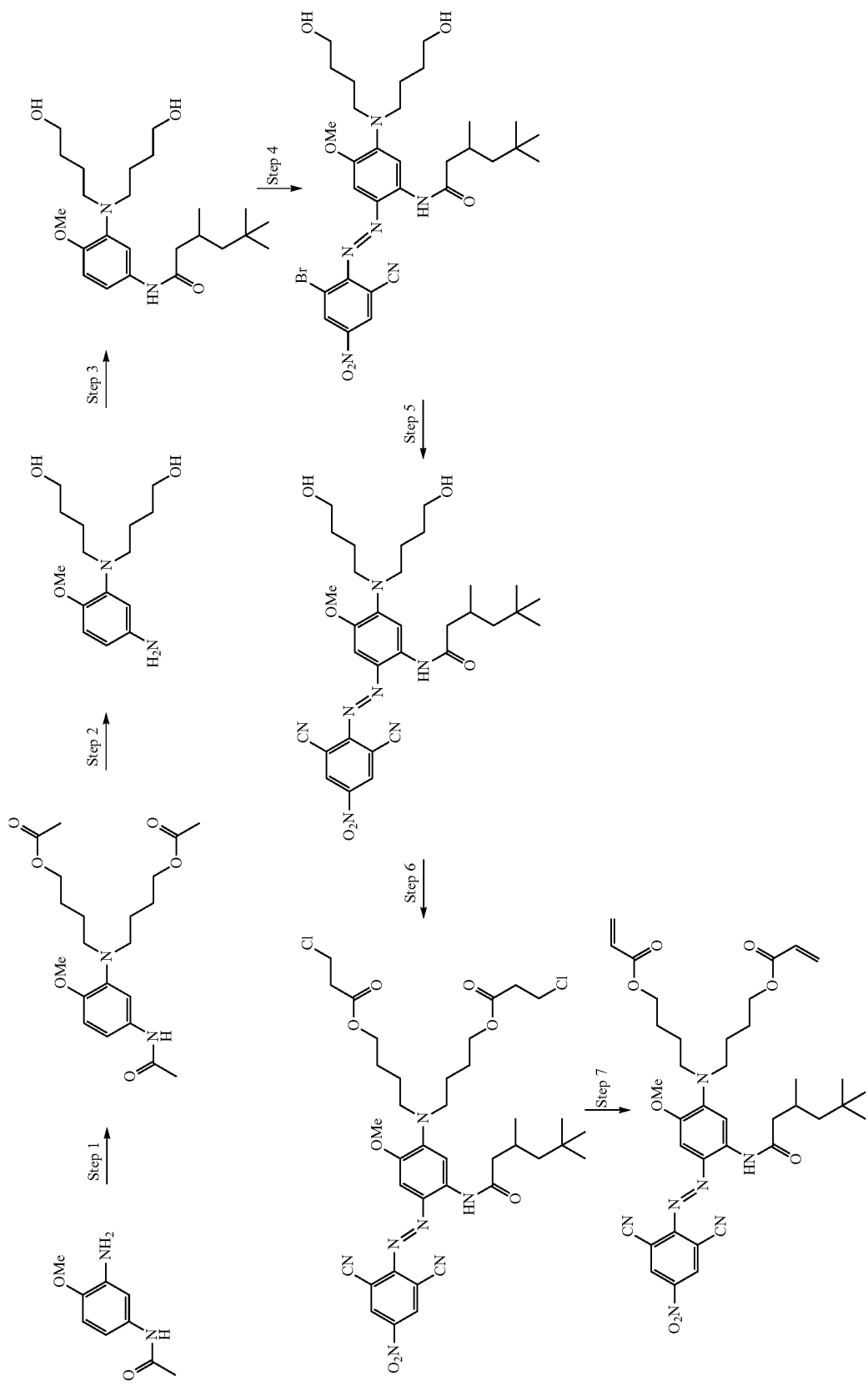

Primarily, the invention provides reflective coloured particles by incorporating an inorganic material of sufficiently high refractive index and white reflectivity into a coloured organic polymer based particle to yield a hybrid polymeric particle which exhibits good reflective properties. Preferably, white reflective particles are used having a refractive index of ≥1.8, especially ≥2.0, are used. Especially titanium dioxide (titania), zinc oxide, silicon dioxide, alumina, barium sulphate, zirconium dioxide, calcium carbonate, kaolinite, diantimony trioxide and/or tin dioxide, especially titanium dioxide, can be used.

Preferably, titanium dioxide based pigments are used which could have the rutile, anatase, or amorphous modification, preferably rutile or anatase, Examples are: Sachtleben RDI-S, Sachtleben R610-L, Sachtleben LC-S, Kronos 2081, Kronos 2305, Sachtleben Hombitan Anatase, Sachtleben Hombitan Rutile, Du Pont R960, Du Pont R350, Du Pont R104, Du Pont R105, Du Pont R794, Du Pont R900, Du Pont R931, Du Pont R706, Du Pont R902+, Du Pont R103, Huntsman TR-81, Huntsman TR-28, Huntsman TR-92, Huntsman R-TC30, Huntsman R-FC5, Evonik P25, Evonik T805, Merck Eusolex T2000, Merck UV Titan M765. Preferably, Du Pont R960, and Sachtleben Hombitan Anatase are used.

The invention allows density control by tunability of the shell around the inorganic core pigment. The amount of the organic polymeric material in the reaction can be increased relative to the inorganic pigment which results in a lower density particle, or if higher density is desired, the pigment ratio can be increased.

Pigments encapsulated within the particles are preferably well dispersed in a non-aggregated state in order to achieve the optimum optical properties. If the pigment is high density, the optimum loading of the pigment within polymer may not only be affected by the optical properties but also the density of the resulting particle in order to achieve improved bistability. Pigments are present in the particle (on weight of total particle) from 5-95%, preferably 20-80% and even more preferably 30-60%.

A further essential component of the present invention is a polymerisable steric stabiliser. The polymerisable steric stabilisers need to be soluble in non-polar solvents, particularly dodecane, and have some reactive functionality such that they take part in the polymerisation. This creates a particle with a covalently bound surface of sterically stabilising compounds providing stability during and after polymerisation. The polymerisable steric stabiliser can be used in a range of molecular weights which allows strict control over the steric barrier surrounding the particles to prevent aggregation. The polymerisable group incorporates irreversibly into the particles and is therefore anchored to the surface.

A typical polymerisable steric stabiliser of the invention is a poly(dimethylsiloxane) macro-monomer (PDMS). The poly(dimethylsiloxane) may comprise one or two polymerisable groups, preferably one polymerisable group.

The following stabiliser types could be used and are commercially available from Gelest Inc.:

Methacryloyloxypropyl terminated polydimethylsiloxanes (mws 380, 900, 4500, 10000, 25000) Methacryloyloxypropyl terminated polydimethylsiloxanes (mw 600), Methacryloyloxypropyl terminated polydimethylsiloxanes (1500, 1700), (3-acryloxy-2-hydroxypropoxypropyl) terminated PDMS (mw 600), Acryloxy terminated ethyleneoxide-dimethylsiloxane-ethyleneoxide ABA block copolymers (mw 1500, 1700), methacyloyloxypropyl terminated branched polydimethylsiloxanes (683), (methacryloxypropyl)methylsiloxanes-Dimethylsiloxane copolymers (viscosity 8000, 1000, 2000), (acryloxypropyl)methylsiloxane-dimethylsiloxanes copolymers (viscosity 80, 50), (3-acryloxy-2-hydroxypropoxypropyl)methylsiloxane-dimethylsiloxane copolymers (mw 7500), mono(2,3-epoxy)propyl ether terminated polydimethylsilxoanes (mw 1000, 5000), monomethacryloxypropyl terminated polydimethylsiloxanes asymmetric (mw 600, 800, 5000, 10000), monomethacryloxypropyl functional polydimethylsiloxanes-symmetric (mw 800), monomethacryloxypropyl terminated polytrifluoropropylmethylsiloxanes-symmetric (mw 800) monovinyl terminated polydimethylsiloxanes (mw 5500, 55000, monovinyl functional polydimethylsilxanes-symmetric (mw 1200).

Preferred polymerisable groups are methacrylate, acrylate, and vinyl groups, preferably methacrylate and acrylate groups. Most preferred are poly(dimethylsiloxane) methacrylates (PDMS-MA), especially methacryloyloxypropyl terminated PDMS-MAs as shown in Formulas 1 and 2, wherein n=5-10000. Most preferred are poly(dimethylsiloxanes) with one methacrylate group.

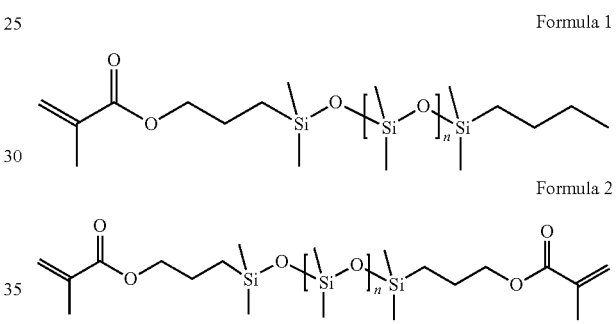

Formula 1

Formula 2

The polymerisable steric stabiliser of the invention preferably has a molecular weight in the range of 1000-50000, preferably 3500-35000, most preferably 5000-25000. Most preferred are methacrylate terminated polydimethylsiloxanes with a molecular weight of 10,000 or more, especially 10000-25000.

Preferably, at least one surfactant is used as additional component for particles of the present invention. Typical surfactants are soluble in aliphatic solvents used for polymerisation and have an oil soluble tail to provide stability with a hydrophilic head to provide adsorption to the pigment particle surface. Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (eg. PEO/PEG/PPG), polyols (eg. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants. Preferably, polyisobutylene succinimides may be used.

Examples of preferred surfactants are the Span, Brij and Tween range (Sigma-Aldrich), the Solsperse, Ircosperse and Colorburst range (Lubrizol), the OLOA range (Chevron Chemicals) and Aerosol-OT (A-OT) (Aldrich), A-OT (dioctyl sulfosuccinate sodium salt), Span 80 and Span 85 (partially unsaturated sorbitan trioleate), Solsperse 17000, and OLOA 1100 are particularly useful to disperse and coat titania in this reaction. Single surfactants as well as blends of surfactants may be used.

The particles of the invention can be prepared from many polymer types. Preferably, monomers are used where the monomer is soluble in the reactive mixture and the polymer is insoluble in the reactive mixture with relatively high Tg. This allows hard composite particles to be formed which tend to be spherical in shape and have easily tunable size.

The main requirement for the polymer composition is that it needs to be produced from a monomer that is soluble but polymer insoluble in the EPD fluid, i.e. dodecane and can also provide some linkage to the surface of the titania during polymerisation. Low solubility of the polymer material in the EPD dispersion media reduces the tendency for ripening processes to take place and helps define the particle size and size dispersity.

The particles can be prepared from most monomer types, in particular methacrylates, acrylates, methacrylamides, acrylonitriles, α-substituted acrylates, styrenes and vinyl ethers, vinyl esters, propenyl ethers, oxetanes and epoxys but would typically be prepared from largest percentage to be monomer, then cross-linker, and include a charged monomer (e.g. quaternised monomer). Especially preferred is methyl methacrylate but many others could be used, the following are all examples of which could be used which are commercially available from the Sigma-Aldrich chemical company. Mixtures of monomers may also be used.

Methacrylates:

Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy) ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate.

Preferably Methyl methacrylate (MMA), Methacrylic acid, Ethyl methacrylate (EMA), and/or n-Butyl methacrylate (BMA) are used.

Acrylates:

Acrylic acid, 4-Acryloylmorpholine, [2-(Acryloyloxy) ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol) 2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidised acrylate, 3-Sulfopropyl acrylate potassium salt, Tetrahydrofurfuryl acrylate, 3-(Trimethoxysilyl)propyl acrylate, 3,5,5-Trimethylhexyl acrylate.

Preferably Methyl acrylate, acrylic acid, Ethyl acrylate (EMA), and/or n-Butyl acrylate (BMA) are used.

Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl) trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl) methyl]acrylamide.

Styrenes

Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)

styrene, 4-(Trifluoromethyl)styrene, 2,4,6-Trimethylstyrene. Preferably Styrene and/or Divinyl benzene are used.
Vinyl Groups 3-Vinylaniline, 4-Vinylaniline, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl) trimethylammonium chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate.

Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl]1,6-hexanediylbiscarbamate, Bis[4-(vinyloxy)butyl]isophthalate, Bis[4-(vinyloxy)butyl](methylenedi-4,1-phenylene) biscarbamate, Bis[4-(vinyloxy)butyl]succinate, Bis[4-(vinyloxy)butyl]terephthalate, Bis[4-(vinyloxymethyl) cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol)divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl]phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane)tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3,1-propanediyl)]bisacrylamide,
Hydroxypivalyl hydroxypivalate bis[6-(acryloyloxy) hexanoate], Neopentyl glycol diacrylate, Pentaerythritol diacrylate, Pentaerythritol tetraacrylate, Pentaerythritol triacrylate, Poly(propylene glycol)diacrylate, Poly(propylene glycol)dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl] isocyanurate, Tri(propylene glycol)diacrylate.

Optionally, the monomer composition comprises at least one charged co-monomer.

Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino) propyl]trimethylammonium chloride, [2-(Methacryloyloxy) ethyl]trimethylammonium methyl sulfate solution, tetraallyl ammonium chloride, diallyl dimethyl ammonium chloride, (Vinylbenzyl)trimethylammonium chloride.

Preferably 2-methacryloxy ethyl trimethyl ammonium chloride (MOTAC) and acryloxy ethyl trimethyl ammonium chloride (AOTAC) are used.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly (acrylic acid) potassium salt, Poly(acrylic acid) sodium salt, Poly(acrylic acid), Poly(acrylic acid, sodium salt) solution, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Poly(acrylonitrile-co-butadiene-co-acrylic acid), dicarboxy terminated, Poly(acrylonitrile-co-butadiene-co-acrylic acid), dicarboxy terminated, glycidyl methacrylate diester,
2,3-Diphenyl-Acrylic Acid, 2-Me-Acrylic Acid, 3-(1-Naphthyl)Acrylic Acid, 3-(2,3,5,6-Tetramethylbenzoyl)Acrylic Acid, 3-(4-Methoxyphenyl)Acrylic Acid, 3-(4-Pyridyl) Acrylic Acid, 3-p-Tolyl-Acrylic Acid, 5-Norbornene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2(2',4'-Difluoro[1,1'-Biphenyl]-4-Yl)-2-Oxoethyl]Acrylic Acid, 2-(2-(2-Chloroanilino)-2-Oxoethyl)-3-(4-Methoxyphenyl) Acrylic Acid, 2-(2-((2-Hydroxyethyl)Amino)-2-Oxoethyl)-3-(4-Methoxyphenyl)Acrylic Acid, 2-(2-(Cyclohexylamino)-2-Oxoethyl)-3-(4-Methoxyphenyl)Acrylic Acid.

Especially preferred co-monomers are methyl methacrylate, methyl acrylate, and methacrylic acid, acrylic acid, ethane-1,2 diacrylate, butane-1,4 diacrylate, hexane-1,6-diacrylate. Furthermore, mixtures of co-monomers described in the foregoing may be used. Preferred co-monomers mixtures comprise methyl methacrylate, methyl acrylate, methacrylic acid, acrylic acid, ethane-1,2 diacrylate, butane-1,4 diacrylate, hexane-1,6-diacrylate, trimethyloipropane triacrylate, 2-methacryloxy ethyl trimethyl ammonium chloride (MOTAC) and/or acryloxy ethyl trimethyl ammonium chloride (AOTAC).

Advantageously, the particles of the invention comprise a combination of the above-mentioned preferred compounds of pigment, polymerisable steric stabiliser, polymerisable dye, co-monomer, and optionally cross-linking co-monomer. Most preferred are combinations of titanium dioxide, methacrylate terminated polydimethylsiloxanes with a molecular weight of 10,000 or more, polymerisable dyes of Table 1, and methyl methacrylate. Especially, combinations of titanium dioxide, at least one polymerisable dyes of Table 1, surfactant (especially A-OT, Span 80 or Span 85, Solsperse 17000, OLOA 11000), methacrylate terminated polydimethylsiloxanes with a molecular weight of 10,000 or more, and methyl methacrylate are preferred. In particular, the particles consist of titanium dioxide, at least one polymerisable dyes of Table 1, surfactant (especially A-OT, Span 80 or Span 85, Solsperse 17000, OLOA 11000), methacrylate terminated polydimethylsiloxanes with a molecular weight of 10,000 or more, and methyl methacrylate.

Charging the polymer can also be facilitated by using an initiator which is charged leaving that charge residing as an end-group on the polymer. Such examples are 2,2'-azobis (2-methylpropionamidine)dihydrochloride (V-50) (Wako Chemicals), potassium peroxodisulfate (KPS), ammonium peroxodisulfate (APS), sodium peroxodisulfate (SPS), 2,2'-azobiscyanovaleric acid (ACVA) (Wako Chemicals), 2,2'-azobis[2-(2-imidazolin-2-yl)propane]dihydrochloride (VA044) (Wako Chemicals).

Charging does not have to come from the initiator fragment so initiators which can also be used are those such as 2,2'-azobis(isobutyronitrile) (AIBN) (Wako Chemicals), 2,2'-azobis(2-methylbutyronitrile) (Vazo 67) (Wako Chemicals) and benzoyl peroxide.

A further subject of the invention is a process for the preparation of particles comprising a pigment core particle encapsulated by a polymer, wherein the polymer preferably comprises monomer units of at least one polymerisable dye, at least one co-monomer, at least one polymerisable steric stabiliser, optionally at least one charged co-monomer, and optionally at least one crosslinking co-monomer.

Furthermore, the invention relates to a process for the preparation of particles comprising a single organic or inorganic pigment core particle encapsulated by a polymer and wherein the particles comprise at least one surfactant.

In particular, the invention relates to a process for the preparation of particles comprising a single organic or inorganic pigment core particle coated with at least one surfactant and encapsulated by a polymer, wherein the polymer preferably comprises monomer units of at least one polymerisable steric stabiliser, at least one co-monomer, and optionally at least one charged co-monomer, and optionally at least one crosslinking co-monomer.

The present process comprises the following steps:
a) dispersing at least one pigment particle in a solution of at least one polymerisable steric stabiliser in a non-polar organic solvent, preferably an aliphatic hydrocarbon;
b) adding at least one polymerisable dye, at least one co-monomer, at least one initiator, and optionally at least one chain transfer agent;
c) subjecting the dispersion of step b) to heating and optional sonication/milling/high shear mixing or stirring for polymerisation,
d) optionally washing by repeated centrifugation or filtration, preferably stirred filtration, and redispersion in fresh solvent, and
e) optionally isolating the resulting coated particles.

Preferably, the process comprises using at least one surfactant in step a). Surfactant addition must be carefully controlled and optimized. If surfactant level is too low, pigment is present as aggregates and if the level is too high pigment will not be encapsulated. Each pigment and surfactant system has a slightly different optimum, though in general a level of 4-8% surfactant on weight of pigment is usually around the optimum level. The level varies due to differences in effectiveness and efficiency of surfactants and surface modification and surface area of pigment. This process provides pigment particles, especially titania, wherein a single pigment particle is embedded in a coloured polymeric shell by addition of a surfactant to the particles before polymerisation.

Optionally, the polymerisable compositions of the invention comprise a chain transfer agent, e.g. catalytic chain transfer reagents, alkyl and aryl thiols, alcohols and carboxylic acids, halogenated organics and selected inorganic salts. Examples of suitable chain transfer agents are 2-propanol, adipic acid, thioglycolic acid, 2-mercaptoethanol, sodium hypochlorite, carbon tetrachloride and heavy metal poryphyrins, particularly cobalt poryphyrins preferably octane thiol.

The polymerisable composition of the invention usually comprises 0.1-15%, preferably 2.0-13%, by weight of at least one polymerisable dye, 0.1-80%, preferably 20-60% by weight of at least one organic or inorganic pigment, preferably 10-40%, by weight of at least one polymerisable steric stabiliser, 50-95%, preferably 60-90%, by weight of co-monomer, optionally 1-40%, preferably 1-10%, by weight of cross-linking co-monomer, optionally 1-30%, preferably 1-10%, by weight of charged co-monomer, optionally 0-3%, by weight of chain transfer agent, and 0.1-10%, preferably 0.1-7.5%, by weight of initiator, all percentages are based on the total weight of the polymerisable composition (except solvent).

Advantageously, the polymerisable composition of the invention comprises in a non-polar hydrocarbon solvent, especially dodecane, 2.0-13% by weight of at least one of the above-mentioned preferred polymerisable dyes, 20-60% by weight of at least one of the above-mentioned preferred pigment particles, 1-10% by weight of at least one of the above-mentioned preferred surfactants, 10-40% by weight of at least one of the above-mentioned preferred polymerisable steric stabilisers, 60-90% by weight of least one of the above-mentioned preferred polymerisable co-monomers, 0.1-7.5% by weight of initiator, optionally 1-10% by weight of cross-linking co-monomer, optionally 1-10% by weight of charged co-monomer, and optionally 0-3%, by weight of chain transfer agent, wherein most preferably of titanium dioxide in the rutile or anatase modification, sorbitan mono or polyoleates as surfactant, at least one of the dyes of Table 1, methacrylate terminated polydimethylsiloxanes with a molecular weight of 10,000 or more, and methyl methacrylate are used.

The coloured polymer particles of the invention are preferably prepared using a dispersion polymerisation. This is a convenient single step method of preparing monodisperse coloured particles. It is performed in a fluid which is a good solvent for the monomer and a non-solvent for the synthesised polymer particles. This solvent can also be used as the same solvent for EPD, e.g. dodecane. The preferred solvents are non-polar hydrocarbon solvents, especially such used in EPD fluids, i.e. the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane. Especially preferred is dodecane. The concentration of the particles in the non-polar solvent can be increased if desired by centrifugation, i.e. forced settling of the particles and pouring off excess solvent, or a stirred cell filtration system can be used. The dispersion can be washed with a non-polar solvent if required. If necessary, the coloured polymer particles are simply separated from the reaction suspension by filtration, preferably by pouring the suspension through a pore size filter, i.e. a 0.1 µm pore size filter, or the particles can be cleaned by centrifuging.

The selection of the polymerisation conditions depends on the required size and size distribution of the particles. Adjustment of polymerisation conditions is well known to someone skilled in the art.

Preferably, a batch polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring.

Thus, a batch polymerisation process is used for manufacture versus a semi-continuous batch process because of limited versatility and simple evaluations of reaction formulation.

Polymerisable compositions of the invention may additionally comprise a surfactant. Typical surfactants are soluble in aliphatic solvents used for polymerisation and have an oil soluble tail to provide stability with a hydrophilic head to provide adsorption to the pigment particle surface. Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (eg. PEO/PEG/PPG), polyols (eg. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants. Preferably, polyisobutylene succinimides may be used.

Examples of preferred surfactants are the Span, Brij and Tween range (Sigma-Aldrich), the Solsperse, Ircosperse and Colorburst range (Lubrizol), the OLOA range (Chevron Chemicals) and Aerosol-OT (A-OT) (Aldrich). A-OT (dioctyl sulfosuccinate sodium salt), Span 80 and Span 85 (partially unsaturated sorbitan trioleate), Solsperse 17000, and OLOA 11000 are particularly useful to disperse and coat titania in this reaction. Single surfactants as well as blends of surfactants may be used.

Preferably the polymerisation according to the invention is a free radical polymerisation.

Typical process conditions are described for titanium dioxide particles coated according to the invention. Titanium dioxide is added to a non-polar hydrocarbon solvents, preferably dodecane and PDMS-methacrylate.

Preferably, a surfactant is added. Preferably polyisobutylene succinimides or a sorbitan mono-, di- or tri-oleate such as Span 85 may be used. Examples of preferred surfactants are the Span, Brij and Tween range (Sigma-Aldrich), the Solsperse, Ircosperse and Colorburst range (Lubrizol), the OLOA range (Chevron Chemicals) and Aerosol-OT (A-OT) (Aldrich). A-OT (dioctyl sulfosuccinate sodium salt), Span 80 and Span 85 (partially unsaturated sorbitan trioleate), Solsperse 17000, and OLOA 11000 are particularly useful to disperse and coat titania in this reaction. Single surfactants as well as blends of surfactants may be used. The solution is stirred or lightly sonicated or milled or high shear mixed to disperse the pigment. A comonomer, preferably MMA, a polymerisable dye, preferably a dye of Table 1, and optionally a chain transfer agent, preferably octanethiol are then added to the solution which is stirred under nitrogen, then heated to 60-90° C., preferably 85° C., optionally in a sonic bath. Sonication is optionally applied to the reaction and an initiator, preferably azobisisobutyronitrile is added to initiate polymerisation. Depending on the surfactant used, the reaction mixture needs solely stirring. The reaction is allowed to proceed for 2-6, preferably 4 hours after which time the reaction is cooled and the particles are cleaned by centrifugation and redispersion in dodecane if required.

Polymer particles prepared according to the invention are preferably spherical particles with a size (diameter) in the range of 50-1200 nm, preferably 400-1000 nm, especially 400-700 nm, and preferably with a monodisperse size distribution. Smaller or larger particles can be further separated if required by centrifugation. Particle sizes are determined by photon correlation spectroscopy of hydrocarbon particle dispersions by a common apparatus such as a Malvern NanoZS particle analyser or preferably by SEM (Scanning Electron Microscopy) and image analysis.

Particles of the invention are primarily designed for use in electrophoretic displays, especially for use in mono, bi or polychromal electrophoretic devices. A typical electrophoretic display preferably consists of the particles dispersed in a low polar or non-polar solvent along with additives to improve electrophoretic properties, such as stability and charge. Examples of such dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

Typical additives to improve the stability of the fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich).). Preferable surfactant additives in this work are Solsperse range and A-OT, and even more preferably Solsperse 17,000, 13650, 11000 and Solplus K500, A-OT and Span 85. Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (e.g. PEO/PEG/PPG), polyols (e.g. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants.

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich).

Usually electrophoretic fluids comprise a charged inorganic nanoparticle such as titania, alumina or barium sulphate, coated with a surface layer to promote good dispersibility in dielectric media and a dielectric fluid media. The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767) and WO 2005/017046) The Electrophoretic fluid is then incorporated into an Electrophoretic display element by a variety of pixel architectures, such as can be found in C. M. Lampert, Displays; 2004, 25(5) published by Elsevier B. V., Amsterdam.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, TIR-EPD (total internal reflection electrophoretic devices), one particle systems, two particle systems, dyed fluids, systems comprising microcapsules, microcup systems, air gap systems and others as described in C. M. Lampert, Displays; 2004, 25(5) published by Elsevier B. V., Amsterdam. Examples of flexible displays are dynamic keypads, e-paper watches, dynamic pricing and advertising, e-readers, rollable displays, smart card media, product packaging, mobile phones, lab tops, display card, digital signage.

Particles of the invention may also be used in optical, electrooptical, electronic, electrochemical, electrophotographic, electrowetting displays and/or devices, e.g. TIR (total internal reflection electronic devices), and in security, cosmetic, decorative, and diagnostic applications. The use in electrowetting displays is preferred. Electrowetting (ew) is a physical process where the wetting properties of a liquid droplet are modified by the presence of an electric field. This effect can be used to manipulate the position of a coloured fluid within a pixel. For example, a nonpolar (hydrophobic) solvent containing colourant can be mixed with a clear colourless polar solvent (hydrophilic), and when the resultant biphasic mixture is placed on a suitable electrowetting surface, for example a highly hydrophobic dielectric layer, an optical effect can be achieved. When the sample is at rest, the coloured non-polar phase will wet the hydrophobic surface, and spread across the pixel. To the observer, the pixel would appear coloured. When a voltage is applied, the hydrophobicity of the surface alters, and the surface interactions between the polar phase and the dielectric layer are no longer unfavourable. The polar phase wets the surface, and the coloured non-polar phase is thus driven to a contracted state, for example in one corner of the pixel. To the observer, the pixel would now appear transparent. A typical electrowetting display device consists of the particles in a low polar or non-polar solvent along with additives to improve properties, such as stability and charge. Examples of such electrowetting fluids are described in the literature, for example in WO2011/017446, WO 2010/104606, and WO2011075720.

The disclosures in the cited references are thus expressly also part of the disclosure content of the present application. In the claims and the description, the words "comprise/comprises/comprising" and "contain/contains/containing" mean that the listed components are included but that other components are not excluded. The following examples explain the present invention in greater detail without restricting the scope of protection.

EXAMPLES

Reagents are purchased from Sigma-Aldrich unless otherwise stated. PDMS monomer is purchased from Gelest Inc. Titanium Dioxide used is R960, obtained from DuPont.

Magenta and Yellow dyes used to make particles are previously reported in WO 2012/019704.

Particle size is measured by SEM.

The characterisation of the formulations is performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Electrophoretic mobility measurements are made on a Malvern Zetasizer Nano ZS. The measurement is made using a combination of Laser Doppler velocimetry and phase analysis light scattering. The formulations are first diluted (1 drop of dispersion into approximately 2 ml dodecane). The measurement is made using the Universal Dip cell (suitable for non-aqueous systems) and a glass cuvette. Mobility unit of measure is µmcm/Vs.

Reflectivity Measurements

Reflectivity measurements are made using an X-rite Color i5 benchtop spectrophotometer. All measurements are made in glass cells with a 50 micron cell depth. The cells have no polyimide coating and no ITO electrodes. The cells are capillary filled and measurements are made immediately after filling. The cell is measured in the X-rite spectrophotometer. The reflectivity measurements are made with a black background, the values obtained are $L^*$, $a^*$, $b^*$, X, Y, Z, x and y. The $L^*$ component represents the lightness of the sample ($L^*=0$ being a black sample and $L^*=100$ a white sample). The $a^*$ value represents the co-ordinate where the sample lies between red and green (negative values indicating a green sample and positive a red sample). The $b^*$ component represents the co-ordinate where the sample lies between yellow and blue (here negative values indicate a blue sample and positive a yellow sample). The Y value is derived from the CIE xyY colour space, where Y is defined to be the brightness or luminance of the sample, and also scales between 0-100.

Example 1

(E)-4,4'-(4-((2,6-dicyano-4-nitrophenyl)diazenyl)-2-methoxy-5-(3,5,5-trimethylhexanamido)phenylazanediyl)bis(butane-4,1-diyl)diacrylate (Dye 3)

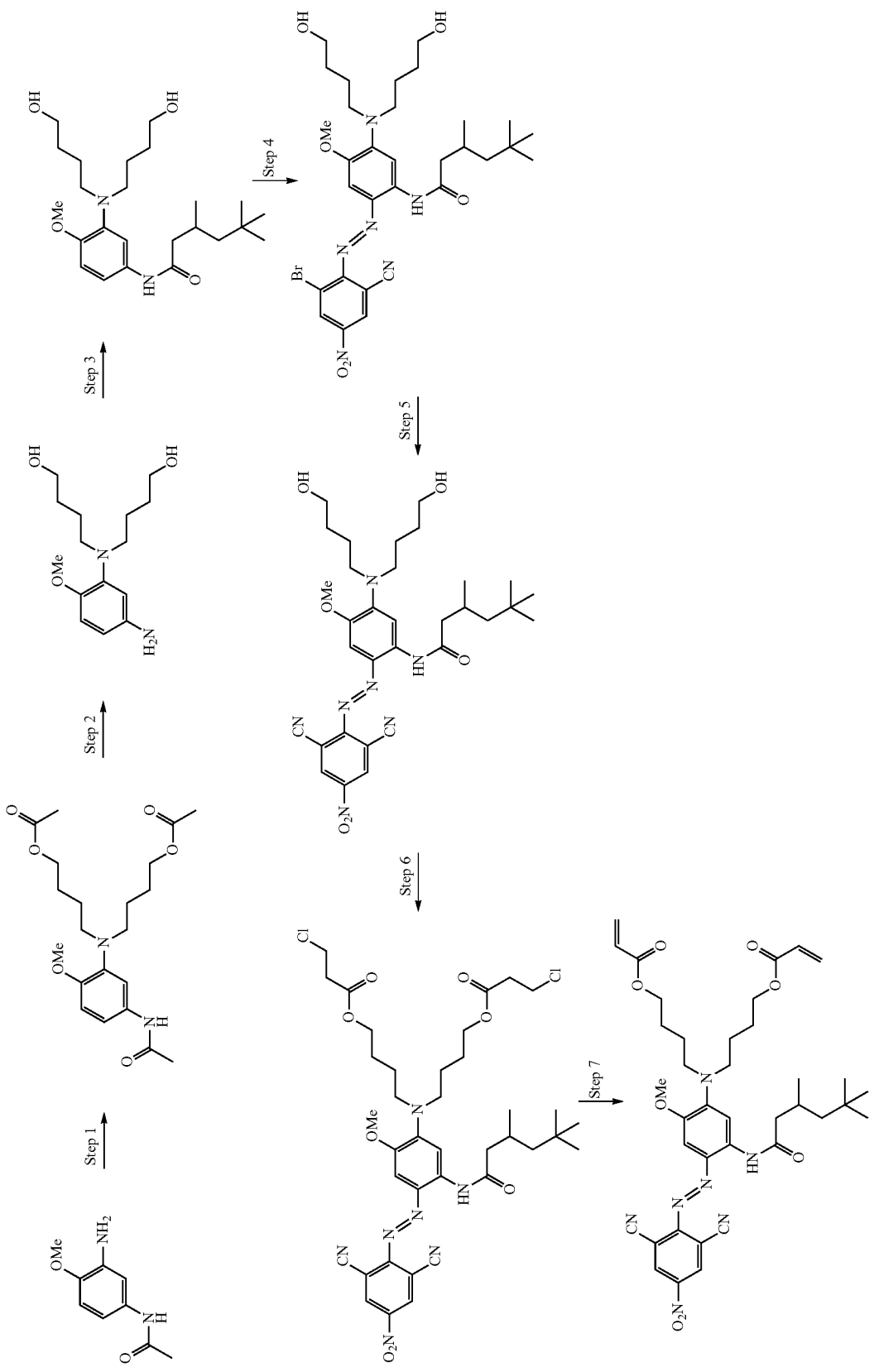

Step 1: 4,4''-(5-acetamido-2-methoxyphenylazanediyl)bis(butane-4,1-diyl)diacetate A stirred mixture of 3'-amino-4'-methoxyacetanilide (18.0 g, 0.1 mol), 4-bromobutyl acetate (48.8 g, 0.25 mol), 1-methyl-2-pyrrolidinone (50 ml) and sodium bicarbonate (55.2 g, 0.66 mol) is heated in an oil bath at 105° C. overnight, allowed to cool and then poured into water (500 ml), After stirring for 30 minutes, the oil that separates is extracted with dichloromethane (150 ml), the organic layer is dried ($MgSO_4$) and evaporated to give a thick brown oil (57.0 g). The oil is used directly without further purification (95% purity).

Step 2: 4,4'-(5-amino-2-methoxyphenylazanediyl)dibutan-1-ol

Crude 4,4'-(5-acetamido-2-methoxyphenylazanediyl)bis(butane-4,1-diyl)diacetate (0.1 mol) is dissolved in dioxane (200 ml) and 1M LiOH (300 ml) is added. After 15 minutes, the reaction is neutralised with 35% HCl (5 ml) then evaporated to give a brown oil. The oil is dissolved in a mixture of water (200 ml) and 35% HCl (100 ml) and heated for 4 h at 90° C., allowed to cool to RT, basified to pH 11.0 and the resultant oil is extracted with DCM (2×150 ml), dried ($MgSO_4$) and evaporated to give a dark brown viscous oil. (28.3 g, 100%). The crude product is used directly without purification.

Step 3: N-(3-(Bis(4-hydroxybutyl)amino)-4-methoxyphenyl)-3,5,5-trimethylhexanamide 4,4'-(5-Amino-2-methoxyphenylazanediyl)dibutan-1-ol (50 mmol) is dissolved in dichloromethane (200 ml) and to this is added triethylamine (7.6 g, 75 mmol). 3,5,5-Trimethylhexanoyl chloride (8 ml) is added dropwise. Methanol (100 ml) is added and the reaction is stirred overnight and is used directly without further purification.

Step 4: (E)-N-(5-(Bis(4-hydroxybutyl)amino)-2-((2-bromo-6-cyano-4-nitrophenyl)diazenyl)-4-methoxyphenyl)-3,5,5-trimethylhexanamide Sulfuric acid (80% w/w, 75 ml) is cooled to 5° C. and 6-bromo-2-cyano-4-nitroaniline (9.7 g, 40 mmol) is added and stirred for 10 minutes at <5° C. until fully dispersed. Nitrosyl sulfuric acid 40% (w/w) in sulfuric acid (15.3 g, 0.048 mol) is added in portions at 3-5° C. over 30 minutes, then stirred for a further hour at <5° C. N-(3-(Bis(4-hydroxybutyl)amino)-4-methoxyphenyl)-3,5,5-trimethylhexanamide (assume 41 mmol) is diluted with methanol (100 ml), cooled externally in an ice bath to 5° C. and solid ice (50 g) and water (50 ml) are added. Sulfamic acid (10 ml) is added. The above diazonium salt solution is added dropwise over 1 hour. The reaction is stirred overnight, then the solid filtered-off and dried overnight at 40° C. (13.4 g, 50%). The crude product is recrystallised from hot IMS to give the required dye as a green crystalline solid (8.9 g, 32%).

Step 5: (E)-N-(5-(bis(4-hydroxybutyl)amino)-2-((2,6-dicyano-4-nitrophenyl)diazenyl)-4-methoxyphenyl)-3,5,5-trimethylhexanamide N-(5-(Bis(4-hydroxybutyl)amino)-2-((2-bromo-6-cyano-4-nitrophenyl)diazenyl)-4-methoxyphenyl)-3,5,5-trimethylhexanamide (8.8 g, 13.0 mmol) is suspended in 1-methyl-2-pyrrolidinone (15 ml) and warmed to 55° C. to dissolve. Zinc cyanide (0.82 g, 7 mmol) followed by copper(I) cyanide (0.4 mg, 0.45 mmol) are added and the reaction heated to 105° C. (bath temp). After 3 h, external heating is removed and methanol (45 ml) is added. The resultant crystalline solid is filtered off. The solid is recrystallised from IMS (6.1 g, 75%).

Step 6: (E)-4,4'-(4-((2,6-dicyano-4-nitrophenyl)diazenyl)-2-methoxy-5-(3,5,5-trimethylhexanamido)phenylazanediyl)bis(butane-4,1-diyl)bis(3-chloropropanoate)

(E)-N-(5-(Bis(4-hydroxybutyl)amino)-2-((2,6-dicyano-4-nitrophenyl)diazenyl)-4-methoxyphenyl)-3,5,5-trimethylhexanamide (6.0 g, 9.7 mmol) and sodium bicarbonate (8.1 g, 97 mol) are suspended in dichloromethane (120 ml) and 3-chloropropionyl chloride (3.7 g, 29.1 mmol) added. The mixture is heated at 40° C. overnight. Methanol (300 ml) is added and the mixture is concentrated in vacuo to half volume. The precipitated tarry solid is filtered off. The solid is added to dichloromethane (100 ml) and stirred for 5 minutes to dissolve, before inorganics are removed by filtration. The dichloromethane solution is evaporated to give the crude product as a black tarry solid (7.7 g, 90%). The material was purified over silica gel, eluting with 2-5% ethyl acetate in dichloromethane. Combination and evaporation of the pure fractions afford the required compound as a black tarry solid (6.8 g, 80%), which is >99% pure by HPLC.

Step 7: (E)-4,4'-(4-((2,6-dicyano-4-nitrophenyl)diazenyl)-2-methoxy-5-(3,5,5-trimethylhexanamido)phenylazanediyl)bis(butane-4,1-diyl)bis(acrylate)

(E)-4,4''-(4-((2,6-dicyano-4-nitrophenyl)diazenyl)-2-methoxy-5-(3,5,5-trimethylhexanamido)phenyl-azanediyl)bis(butane-4,1-diyl)bis(3-chloropropanoate) (6.8 g, 8.5 mmol) is dissolved in dichloromethane (68 ml) and triethylamine (6.0 ml, 43 mmol) is added. The reaction is warmed for 3 h at 35° C. The solution is washed with 0.2 N HCl, then with water, dried ($Na_2SO_4$) and filtered. The solution is evaporated and the resultant tarry solid redissolved in dichloromethane (200 ml), diluted with methanol (400 ml) and stirred overnight allowing solvent to slowly evaporate. The resultant solid is filtered-off, washed with methanol on the filter and dried under high vacuum until a constant weight was obtained. The required dye was obtained as a dark blue solid (5.4 g, 87%). Mp: 120-121° C., $\lambda_{max}$ (EtOAc) 642 nm (98,000), ½ band width=70 nm. $^1H$ NMR ($CDCl_3$, 300 MHz) δ 0.92 (9H, 5), 1.03 (3H, d, J 6.6), 1.17 (1H, dd, J 14.0, J 6.6), 1.34 (1H, dd, J 14.0, J 3.7), 1.81 (8H, m), 2.16 (1H, m), 2.42 (1H, dd, J 14.0, J 8.0) 2.52 (1H, dd, J 14.0, J 6.5), 3.71 (4H, m), 3.88 (3H, s), 4.23 (4H, t, J 6.0), 5.84 (2H, dd, J 10.5, J 1.5), 6.13 (2H, dd, J 17.3, J 10.5), 6.42 (2H, J 17.3, J 1.5), 7.54 (1H, s), 8.32 (1H, s), 8.63 (2H, s), 9.27 (1H, br. s),

Example 2

Preparation of a Dispersion of Reflective Particles

Example 2a

Preparation of a Dispersion of Reflective Particles Comprising Dye 2

Polydimethylsiloxane monomethacrylate terminated, mw. 10,000 (2.08 g), dodecane (100 ml), titanium dioxide (4.12 g) and Span 80 (0.6 g) are charged to a 250 ml 3-neck round bottom flask. The flask is placed in an ultrasonic bath and is subjected to low power ultrasound for 30 minutes. In a separate flask, methyl methacrylate (11.0 ml), Dye 2 (0.25 g), AIBN (107 mg) and octane thiol (126 μl) are mixed. The contents of the second flask are added to the first, and the 3-neck flask is immersed in a sonic bath at 80° C., and the contents are stirred with an overhead stirrer at 300 rpm, under a flow of nitrogen. After 4 hours, the flask is allowed to cool to room temperature and the contents are filtered though a 50 micron cloth. The magenta dispersion is cleaned by centrifugation and replacing the supernatant with clean dodecane. Average particle size is 520 nm.

Examples 2b-2h

Further reflective particles are similarly prepared, formulated and measured (see Table 2).

TABLE 2

| Example No. | Dye No. | Dye (g) | Colour | TiO2 (g) | Size (nm) | L* | a* | b* | Y | Mobility (3 wt % Span 85) |
|---|---|---|---|---|---|---|---|---|---|---|
| 2a | Dye 2 | 0.25 | Magenta | 4.12 | 520 | | | | | |
| 2b | Dye 2 | 0.259 | Magenta | 4.12 | 823 | 23.78 | 8.37 | −2.58 | 4.03 | 0.2065 |
| 2c | N/A | 0 | White | 4.12 | 660 | 40.43 | −1.37 | −1.08 | 11.51 | 0.1239 |
| 2d | Dye 2 | 0.259 | Magenta | 0.00 | 725 | 18.85 | 12.26 | −4.9 | 2.71 | 0.1447 |
| 2e | Dye 2 | 0.103 | Magenta | 4.14 | 670 | 30.7 | 12.55 | −5.18 | 6.53 | 0.1789 |
| 2f | Dye 3 | 0.103 | Cyan | 4.14 | 704 | 32.29 | −7.2 | −6.73 | 7.22 | |
| 2g | Dye 2 | 0.026 | Magenta | 4.14 | 749 | | | | | |
| 2h | Dye 1 | 0.103 | Yellow | 4.14 | | | | | | |

Example 3

Electrophoretic Formulations Containing Dispersions of Particles of Example 2

Ink formulations (2.00 g) are made and are composed of 3 wt % of particles of Example 2 and 3 wt % of surfactant. The surfactants used are either Span 85 or AOT. This is indicated in Table 2. The 2.00 g formulations are vortex mixed and then roller mixed for 30 minutes.

Reflectivity and electrophoretic mobility measurements are then made. Results are summarised in Table 2.

Particles containing both dyes and white pigments show an improved reflectivity over coloured particles containing no white pigment.

There is no colour shift towards other hues, only towards white, so the fluids appear brighter.

Example 4

Preparation of Reflective Particles incorporating Dye 1

Polydimethylsiloxane monomethacrylate terminated, mw. 10,000 (Gelest, 2.08 g), dodecane (75 g), titanium dioxide (10.30 g), and Span 85 (0.515 g) are charged to a 250 ml 3-neck round bottom flask. The flask is fitted with an overhead stirrer, condenser and nitrogen bubbler. The flask is subjected to 37 Hz power ultrasound for 30 minutes.

In a separate flask, methyl methacrylate (10.3 g), AIBN (0.214 g), Dye 1 (0.103 g), and octane thiol (0.126 ml) are combined. The flask with TiO2 is placed in the sonic bath at 80° C., and the contents are stirred with an overhead stirrer at 300 rpm, under a flow of nitrogen. The monomer solution is then added to this dispersion at a rate of 3.8 mL/hour. After 4 hours, the flask is allowed to cool to room temperature and the contents are filtered though a 50 micron cloth. The dispersion is cleaned by centrifugation at 10 000 rpm for 20 minutes each, replacing the supernatant with dodecane five times.

Further reflective particles are similarly prepared, formulated and measured. Average particle size for these reactions is ~500 nm. Details are shown in Table 3.

TABLE 3

| Example No. | Dye No. | Dye (g) | Colour | TiO2 (g) | L* | a* | b* | Y |
|---|---|---|---|---|---|---|---|---|
| 4a | 1 | 0.2059 | Y | 10.3 | 77.83 | −12.60 | 34.46 | 52.924 |
| 4b | 1 | 0.3090 | Y | 10.3 | 76.62 | −13.65 | 40.02 | 50.900 |
| 4c | 1 | 0.4120 | Y | 10.3 | 76.79 | −14.31 | 45.77 | 51.180 |
| 4d | 1 | 0.5150 | Y | 10.3 | 77.46 | −14.92 | 49.08 | 52.294 |
| 4e | 3 | 0.3090 | C | 10.3 | 55.79 | −16.71 | −22.35 | 23.700 |
| 4f | 2 | 0.3090 | M | 10.3 | 50.95 | 38.47 | −9.92 | 19.225 |

Example 5

Preparation of Reflective Particles Incorporating Dye 1, Using Methacrylic Acid

Polydimethylsiloxane monomethacrylate terminated, mw. 10,000 (Gelest, 2.08 g), dodecane (53.1 g), titanium dioxide (10.30 g), and Span 85 (0.515 g) are charged to a 250 ml 3-neck round bottom flask. The flask is fitted with an overhead stirrer, condenser and nitrogen bubbler. The flask is subjected to ultrasound (37 Hz) for 30 minutes.

In a separate flask, methacrylic acid (10.3 g), dye 1 (0.515 g), toluene (19.1 g) and octane thiol (0.126 ml) are combined and taken up in a syringe. In a separate flask, AIBN (0.214 g) is dissolved in toluene (7.5 g) and the resulting solution taken up in a syringe.

The first flask is placed in the sonic bath at 80° C., and the contents are stirred with an overhead stirrer at 300 rpm, under a flow of nitrogen. The monomer solution is then added to this dispersion using a syringe pump. The initiator solution is added at the same time using a second syringe pump.

On completion, the flask is allowed to cool to room temperature and the contents are filtered though a 50 micron cloth. The dispersion is cleaned by centrifugation. Centrifugations are carried out at 10 000 rpm for 20 minutes each, replacing the supernatant with dodecane; this is repeated five times. These particles are formulated and measured. Results are shown in Table 4.

TABLE 4

| L* | a* | b* | Y |
|---|---|---|---|
| 75.69 | −14.00 | 52.38 | 49.379 |

The invention claimed is:

1. Particles comprising pigment core particles encapsulated by a polymer consisting of monomer units of
   a) at least one polymerisable dye,
   b) at least one co-monomer,
   c) at least one polymerisable steric stabiliser,
   d) optionally at least one charged co-monomer, and
   e) optionally at least one crosslinking co-monomer,
   wherein the core particles are white reflective particles having a refractive index of ≥1.8,
   wherein a single pigment core particle is coated with at least one surfactant and encapsulated by a polymer, and
   wherein the pigment core particle is selected from the group consisting of titanium dioxide, zinc oxide, silicon dioxide, alumina, barium sulphate, zirconium dioxide, calcium carbonate, kaolinite, diantimony trioxide and tin dioxide.

2. The particles according to claim 1, wherein the least one surfactant is soluble in non-polar organic solvents.

3. The particles according to claim 2, wherein the pigment core particle is titanium dioxide in the rutile, anatase, or amorphous modification.

4. The particles according to claim 1, wherein the at least one polymerisable dye is selected from the group consisting of azo dyes, metallised dyes, anthraquinone dyes, phthalocyanine dyes, benzodifuranones dyes, Brilliant Blue derivatives, pyrroline dyes, squarilium dyes, triphendioxazine dyes, and mixtures of these dyes.

5. The particles according to claim 1, wherein the at least one polymerisable dye is at least one dye of Formula (VII)

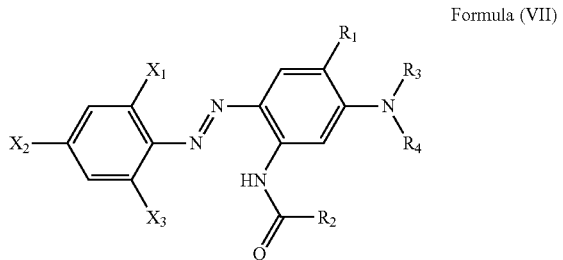

Formula (VII)

wherein
$X_1$, $X_2$, and $X_3$ are independently of one another hydrogen or an electron-withdrawing group;
$R_1$ is hydrogen or OR' with R' is a linear, branched or cyclic alkyl group;
$R_2$ is a linear, branched or cyclic alkyl group;
$R_3$ and $R_4$ are independently of one another groups of the structure $L_3$-$Y_3$, $L_4$-$Y_4$;
$L_3$, and $L_4$ are linker groups and independently of one another linear or branched, substituted or unsubstituted alkylene groups where one or more non-adjacent carbon atoms may be replaced by O, S and/or N;
$Y_3$, and $Y_4$ are independently of one another polymerisable groups;
wherein at least one of $R_3$ and $R_4$ comprises a polymerisable group and at least one of $X_1$, $X_2$, and $X_3$ is an electron-withdrawing group.

6. The particles according to claim 1, wherein the polymerisable steric stabiliser is a poly(dimethylsiloxane) macromonomer with at least one polymerisable group and a molecular weight in the range of 1000-50000.

7. The particles according to claim 1, wherein the polymerisable steric stabiliser is a methacryloyloxypropyl terminated polydimethylsiloxanes.

8. The particles according to claim 1, wherein the percentage of polymerisable steric stabiliser is at least 5% by weight based on the weight of the polymer particle.

9. The particles polymer particles according to claim 1, wherein the particles are coloured and wherein the polymer particles have a diameter of 400-1000 nm.

10. A process for the preparation of particles according to claim 1 comprising
    a) dispersing at least one pigment particle in a solution of at least one polymerisable steric stabiliser in a non-polar organic solvent;
    b) adding at least one polymerisable dye, at least one co-monomer, at least one initiator, and optionally at least one chain transfer agent;
    c) subjecting the dispersion of step b) to heating and optional sonication, milling, stirring or high shear mixing for polymerisation,
    d) optionally washing by repeated centrifugation or stirred filtration and redispersion in fresh solvent, and
    e) optionally isolating the resulting coated particles.

11. The process according to claim 10, wherein at least one surfactant is used in step a).

12. An electrophoretic fluid comprising particles prepared by the process of claim 10.

13. An electrophoretic display device comprising an electrophoretic fluid according to claim 12.

14. The electrophoretic display device according to claim 13, wherein the electrophoretic fluid is applied by a technique selected from inkjet printing, slot die spraying, nozzle spraying, and flexographic printing, or contact or contactless printing or deposition technique.

15. A method comprising utilizing the particles according to claim 1 in optical, electrooptical, electronic, electrochemical, electrophotographic, electrowetting and electrophoretic displays and/or devices, and in security, cosmetic, decorative, and diagnostic applications.

16. An electrophoretic fluid comprising particles according to claim 1.

17. An electrophoretic display device comprising an electrophoretic fluid according to claim 16.

* * * * *